United States Patent
Wiesenthal et al.

(10) Patent No.: US 11,156,205 B2
(45) Date of Patent: Oct. 26, 2021

(54) METHOD FOR CONTROLLING A WIND TURBINE WITH INCREASED SAFETY

(71) Applicant: KEBA Industrial Automation Germany GmbH, Lahnau (DE)

(72) Inventors: Thomas Wiesenthal, Arnsberg (DE); Tobias Theopold, Dortmund (DE)

(73) Assignee: KEBA INDUSTRIAL AUTOMATION GERMANY GMBH, Lahnau (DE)

( * ) Notice: Subject to any disclaimer, the term of this patent is extended or adjusted under 35 U.S.C. 154(b) by 899 days.

(21) Appl. No.: 15/848,128

(22) Filed: Dec. 20, 2017

(65) Prior Publication Data

US 2018/0180023 A1 Jun. 28, 2018

(30) Foreign Application Priority Data

Dec. 23, 2016 (GB) .................................... 1622211

(51) Int. Cl.
  *F03D 7/02* (2006.01)
  *F03D 7/04* (2006.01)
  *F03D 17/00* (2016.01)

(52) U.S. Cl.
  CPC ......... *F03D 7/0224* (2013.01); *F03D 7/0264* (2013.01); *F03D 7/043* (2013.01); *F03D 7/047* (2013.01); *F03D 17/00* (2016.05); *F05B 2240/40* (2013.01); *F05B 2260/74* (2013.01); *F05B 2270/1074* (2013.01); *F05B 2270/328* (2013.01); *F05B 2270/404* (2013.01); *Y02E 10/72* (2013.01)

(58) Field of Classification Search
  CPC ....... F03D 7/0224; F03D 7/0264; F03D 17/00
  See application file for complete search history.

(56) References Cited

U.S. PATENT DOCUMENTS 9,028,214 B2 * 5/2015 Bjork .................... F03D 7/0224
                                                              416/155
2011/0148112 A1  6/2011  Ormel et al.
2012/0219421 A1  8/2012  Axelsson et al.
2014/0028025 A1  1/2014  Ibendorf

FOREIGN PATENT DOCUMENTS

CN          102758726 A     10/2012
CN          104832371 A      8/2015

OTHER PUBLICATIONS

Rosmann; et al. "Analysis of Instability of Direct Powered DC-Compound Machines in Pitch Systems of Large Wind turbines," *IEEE International Conference on Industrial Technology*: 323-329 (Apr. 17, 2010). Abstract.

* cited by examiner

*Primary Examiner* — Michael L Sehn
(74) *Attorney, Agent, or Firm* — Leydig, Voit & Mayer, Ltd.

(57) ABSTRACT

A wind turbine with at least one rotor blade and at least one pith drive for turning the at least one rotor blade, the wind turbine comprising a controller which analyses the wind turbine if a first error situation or a second error situation occurs and wherein the controller is adapted to react to the first error situation in absence of a second error situation with a first error procedure, to a second error situation in absence of the first error situation with a second error procedure, and to an error situation where the first error and the second error occur at the same time with a third error procedure that is different to the first error procedure and to the second error procedure.

12 Claims, 5 Drawing Sheets

Error Modi and Error Sub States in Autonomous Movement

| Failure of Resolver | Failure of Blade Encoder | Failure of Backup | Error State | Motor Control | Rotor Blade Position | SFR Profile |
|---|---|---|---|---|---|---|
| | | | E0 | Resolver | Blade Encoder | Default |
| X | | | E1 | Self-sensing | Blade Encoder | Self-sensing |
| | X | | E2 | Resolver | Resolver | Default |
| | | X | E3 | Resolver | Blade Encoder | Backup failure |
| X | X | | E4 | \multicolumn{2}{Safe Torque Off / Safe Brake Control} | |
| X | | X | E5 | Self-sensing | Blade Encoder | Backup-failure |
| | X | X | E6 | Resolver | Resolver | Backup-failure |
| X | X | X | E4 | Safe Torque Off / Safe Brake Control | | |

METHOD FOR CONTROLLING A WIND TURBINE WITH INCREASED SAFETY

FIELD OF THE INVENTION

The present invention relates generally to the control of wind turbines in error situations.

BACKGROUND TO THE INVENTION

Wind turbines, for example, are used for the conversion of kinetic energy into electrical energy. A wind turbine basically comprises a rotor, including a rotatable hub, at least one rotor blade, a nacelle, which accommodates an electric generator and often a gearbox. The nacelle is rotatably mounted on a tower, so that depending on the direction of the wind, the nacelle can be rotated into the wind, such that the at least one rotor blade directly faces the wind. At present the dominating design of a wind turbine has three rotor blades. Especially in high-power wind turbines, each rotor blade includes a pitch adjustment mechanism configured to rotate each rotor blade about its pitch axis. By rotating the rotor blades about their pitch axis, the lift produced by the wind streaming around the blades and thus the rotational speed of the hub can be controlled.

The control of a wind turbine is quite complex so that usually a controller for controlling the wind turbine is software-controlled. The power acting on a wind turbine is considerably high, so that a wrong command not only could destroy the wind turbine but also is a thread to health and life of a person working at or in the wind turbine or even to neighbours or casual bystanders, in the event the wind turbine disintegrates.

SUMMARY

Embodiments of the invention increase the safety, especially the functional safety of a wind turbine. Functional safety of a system is defined that the system is operating correctly in response to its inputs, including the safe management of likely operator errors, hardware failures and environmental changes.

This safety increase is achieved according to an embodiment of the invention by a wind turbine with at least one rotor blade and at least one pitch drive for turning the at least one rotor blade, the wind turbine comprising a controller which analyses the wind turbine if a first error situation or a second error situation occurs and that the controller is adapted to react:
- to the first error situation in absence of a second error situation with a first error procedure
- to a second error situation in absence of the first error situation with a second error procedure, and
- to an error situation where the first error and the second error occur at the same time with a third error procedure that is different to the first error procedure and to the second error procedure.

In an embodiment of the invention the first error situation is a failure of a resolver for controlling a pitch motor of a pitch drive and the second error situation is a failure of a blade encoder for measuring the position of the rotor blade of the same pitch drive. The error procedure in case a failure of the resolver and the blade encoder occurs at the same time for the same pitch drive the reaction to the error is at least one of to interrupt the power supply to the pitch motor, block the control signals for that pitch motor, engage a brake to block the movement of that rotor blade, requesting all other pitch drives to attain a neutral position.

In an embodiment of the invention once an error situation has been detected this error situation is uphold despite the error may have disappeared. This will avoid the situation that an error occurred and is mitigated by the error procedure so that the error disappears, but will occur again once the pitch drive motor is operated again in the normal conditions. This increases the safety of the wind turbine as it avoids that the second time the wind turbine encounters the same error situation again the damage may be even worse.

In an embodiment of the invention a reaction to an error situation that is characterised by a failure of a resolver is that the pitch drive motor is switched to self-sensing mode in which it controls its speed by sensing its own current supply.

In an embodiment of the invention, wherein the error situation is characterised by a failure of a blade encoder, the position of the rotor blade is calculated from data from the resolver for the same pitch drive.

In an embodiment of the invention, wherein the error situation is a failure of the emergency power backup system, the reaction to the error situation is to turn the rotor blade into a neutral position.

In an embodiment of the invention the controller is adapted to apply predefined limitations to the pitch drive, such as speed limits or acceleration limits as a function of the actual error situation. This allows to react differently to different error situations and to drive the rotor blades as quickly as possibly under the given error situation. This avoids overreactions. In some cases it may be cautious to limit the speed, which may take longer to leave a certain error situation, but it may enable the pitch drive to complete its action, without risking to break down during the performed action.

Figure 5:
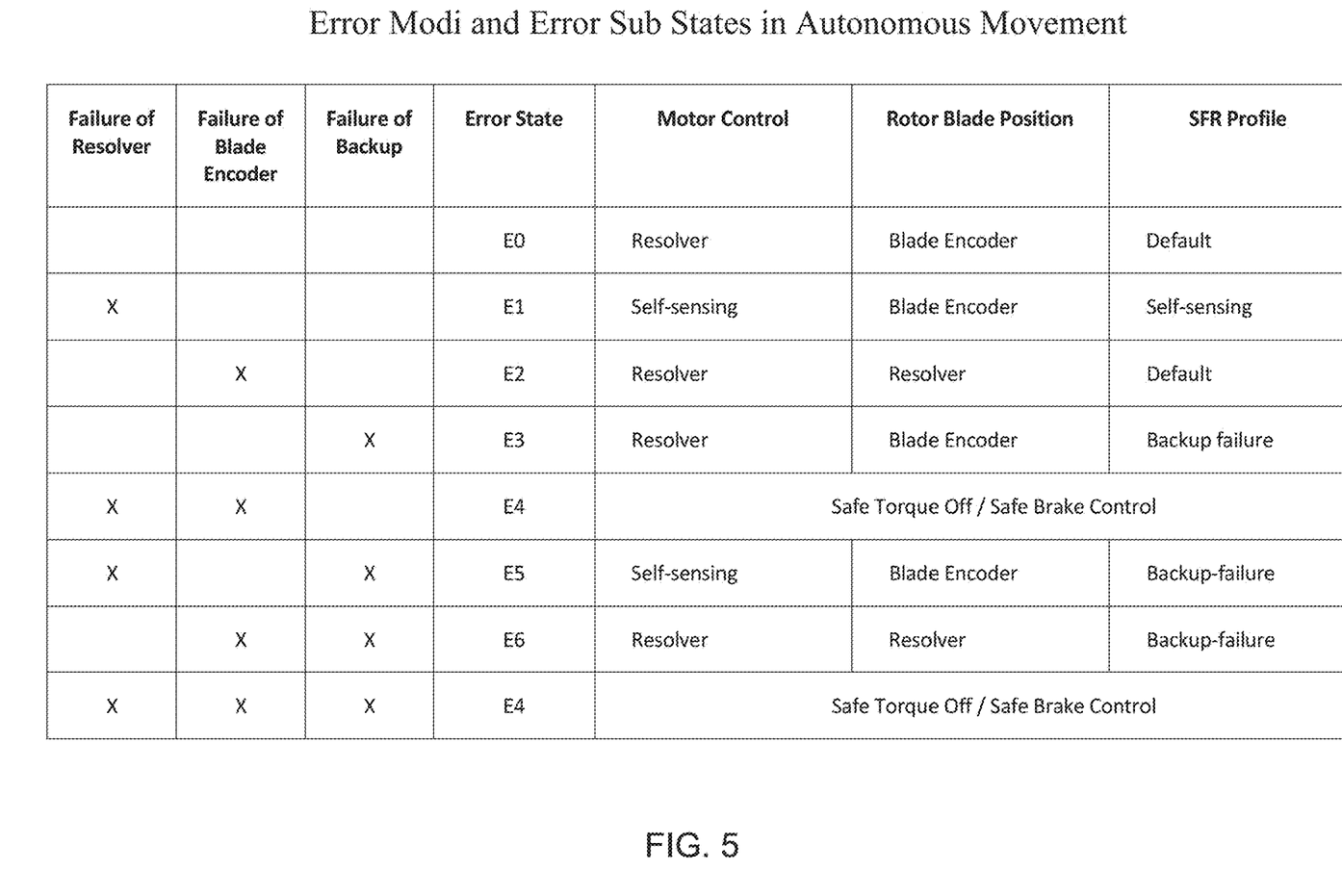
FIG. 5 shows different error modes of a pitch drive.

In an embodiment of the invention with a first error situation which is a failure of the resolver, a second error situation which is a failure of the blade encoder and a third error situation which is a failure of the emergency power backup system adequate actions are performed as shown in FIG. 5.

BRIEF DESCRIPTION OF THE DRAWINGS

A full and enabling disclosure of the present invention is set forth in the specification, which makes reference to the appended figures in which.

DETAILED DESCRIPTION

Reference will now be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations that come within the scope of the appended claims and their equivalents.

Figure 1:
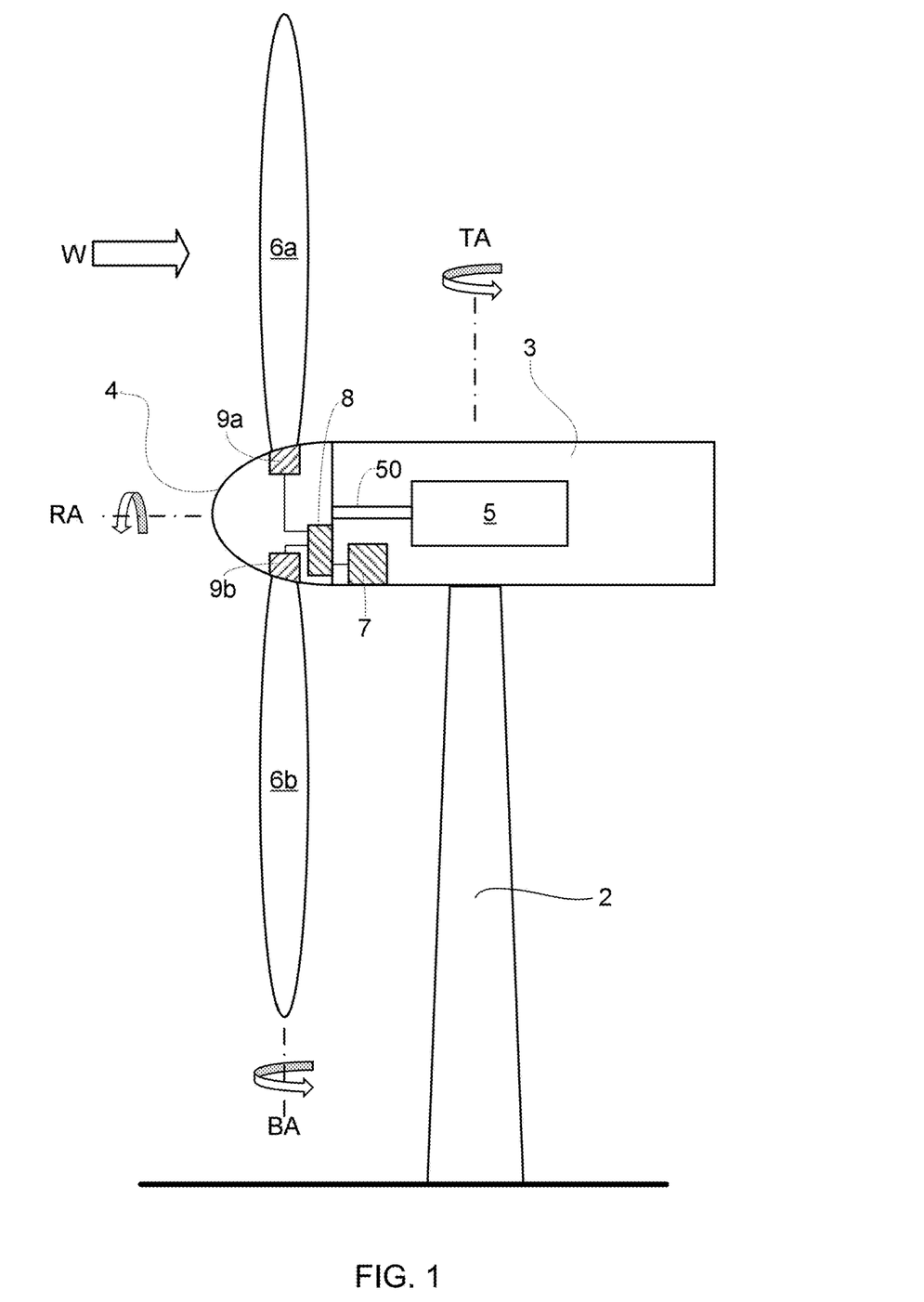
FIG. 1 shows a wind turbine.

FIG. 1 shows an embodiment of a wind turbine according to the invention from a side view. The wind turbine with pitch control comprises several components. A tower 2 which supports a nacelle 3, hub 4 and rotor blades 6a, 6b of the wind turbine is fixed to the ground. Of course, the invention is not limited to on-shore installations but could also be used in connection with so-called off-shore installations where the tower is fixed to a structure in the sea. On top of the tower 2 the nacelle 3 is rotatable mounted such that the nacelle 3 rotates around the axis TA of the tower 2. The nacelle 3 comprises a hub 4 and at least one rotor blade 6a which is rotatable fixed to the hub 4. The wind turbine depicted in FIG. 1 comprises three rotor blades whereby only two rotor blades 6a, 6b are visible. The third rotor blade is not visible as it happens to be concealed by the hub. Hub 4 and rotor blades 6a, 6b are referred to also as the rotor of the wind turbine.

Each rotor blade 6a, 6b is mounted to a pitch drive unit 9a, 9b. As the wind turbine in this example has three rotor blades 6a, 6b, there are three pitch drive units 9a, 9b, 9c (not shown in FIG. 1), one for each rotor blade 6a, 6b. The three pitch drive units 9a, 9b, 9c are controlled by a pitch system controller 8. Each pitch drive unit 9a, 9b, 9c turns each rotor blade 6a, 6b around a rotor blade axis BA. By turning the rotor blades 6a, 6b around their axis BA the angle of attack of the rotor blades 6a, 6b to the wind W can be set to an angle between 0° and 90°, in some installations even negative angles or angles greater than 90° are known. The angle of attack may be chosen thus that the blades 6a, 6b produce no lift, produce maximum lift, or any desired lift in between these two extremes in response to a wind force W.

In FIG. 1 the nacelle 3 is pivoted around its axis TA such that the rotor 4 is facing wind W. In case the rotor blades 6a, 6b are pitched such that the wind W generates lift on the rotor blades 6a, 6b, the lift will force the rotor 4 to spin around a rotor axis RA. An electric current generator 5 coupled by a generator shaft 50 to the rotor 4 produces electric energy which may be fed into an energy distributing net (not shown). The pitch angle of the rotor blades 6a, 6b eventually controls the rotation speed of the rotor 4 and thus also the amount of produced energy.

In one aspect of a wind turbine the pitch system controller 8 and the three pitch drive units 9a, 9b, 9c constitute a pitch control sub system 8, 9a, 9b, 9c which controls the pitch angle of the rotor blades 6a, 6b independently from other sub systems of the wind turbine. A wind turbine may consist of several sub systems, for example another subsystem (not shown) for controlling the rotation of the nacelle 3 around the vertical axis TA and another subsystem comprising the current generator 5 for generating electric power. Each sub system may be supplied by a different manufacturer, respectively subcontractor and may be centrally controlled by the wind turbine control unit 7.

Figure 2:
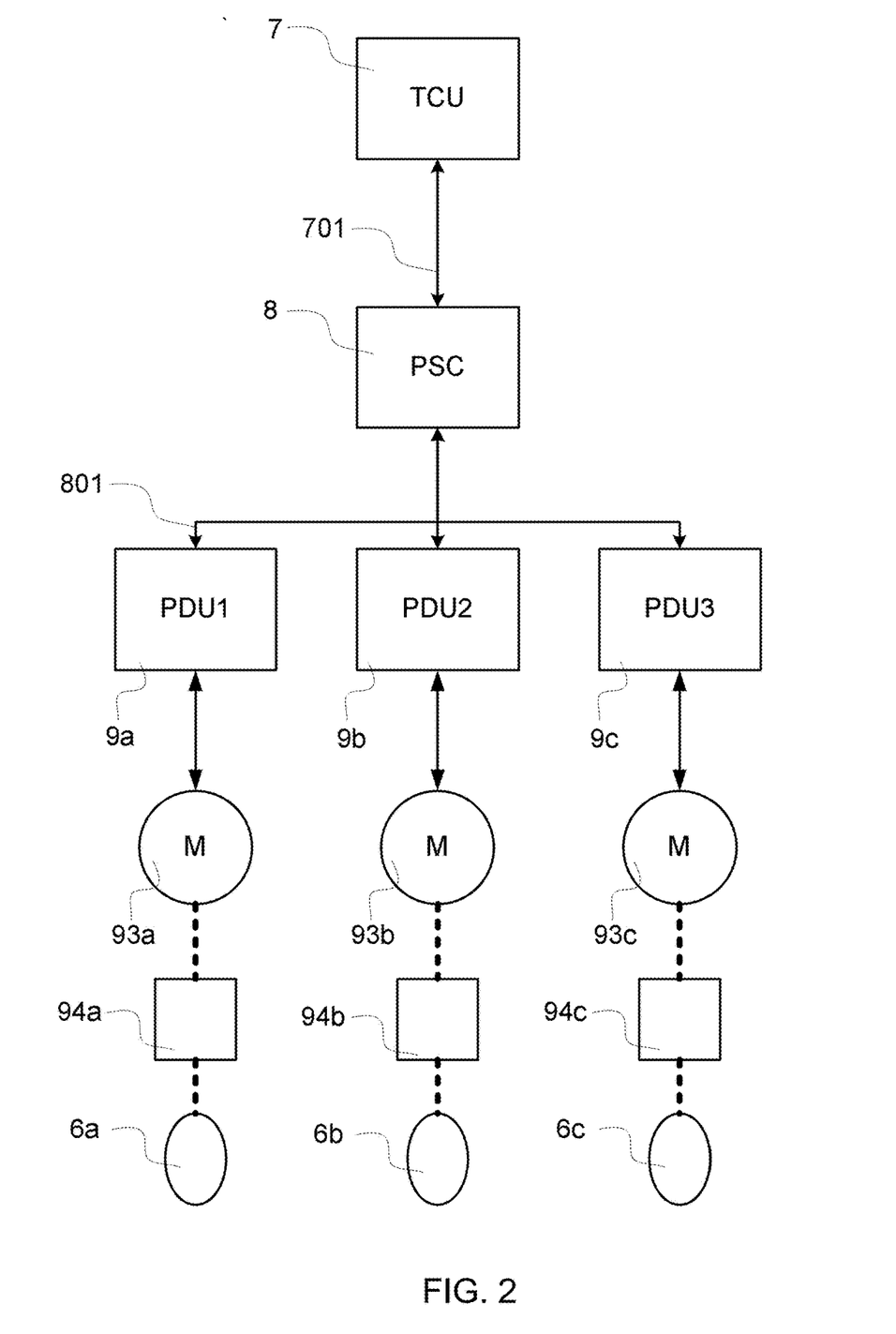
FIG. 2 shows a control system for a wind turbine.

FIG. 2 shows as a functional overview a pitch control system 8, 9a, 9b, 9c of a prior art wind turbine interacting with the wind turbine control unit 7. The wind turbine control unit 7 controls via a data connection 701 a pitch system control module 8. This data connection 701 is for example a field bus. The pitch system control module 8 in turn controls via a data connection 801 three pitch drive control modules 9a, 9b, 9c. This data connection 801 is for example another field bus. The field buses may for example also be a single field bus that is used in common by all control equipment. Each pitch drive control module 9a, 9b, 9c eventually controls a motor 93a, 93b, 93c. Each motor is coupled, for example via gears 94a, 94b, 94c, to the first, second, and third rotor blade 6a, 6b, 6c. The motors turn (pitch) the rotor blades to a desired angle.

Figure 3:
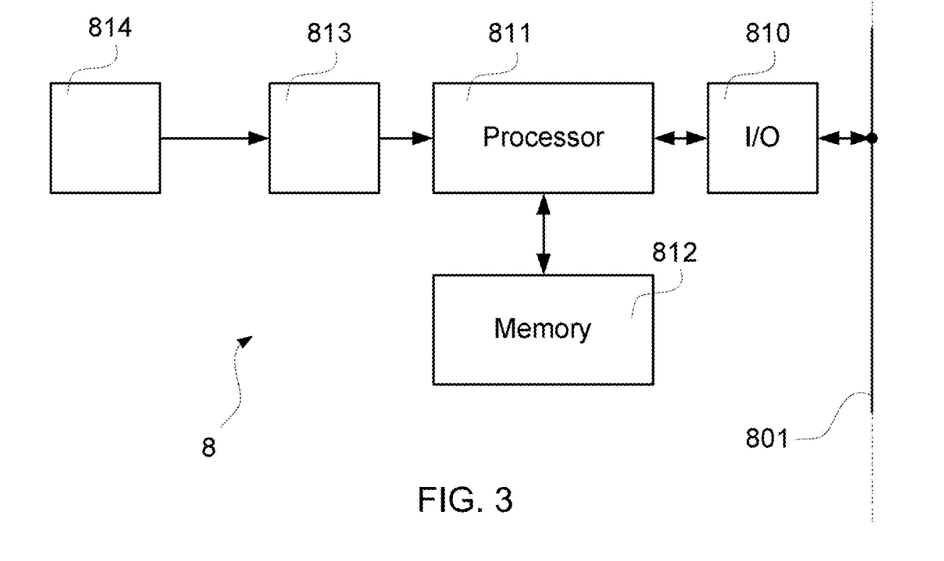
FIG. 3 shows a block circuit diagram of a pitch controller.

FIG. 3 shows illustrated as a block diagram an embodiment of a pitch system control module 8 and components it may comprise. The pitch system control module 8 may comprise one or more processors 811 and associated memory devices 812 configured to perform a variety of computer-implemented functions such as performing the method steps, calculations and the like and storing relevant data as disclosed herein. The pitch system control module 8 may be implemented as one or more printed card boards which are plugged into a pitch system controller card board carrier back plane (not shown). For communicating with various sensors 814, a sensor interface 813 permits signals transmitted from sensors 814 to be converted into signals that can be understood and processed by the processor 811. The sensors 814 may be coupled to the sensor interface 813 via a wired connection, which for example are electrically connected to the said pitch system controller card board carrier back plane. In other embodiments they may be coupled to the sensor interface via a wireless connection.

The pitch system control module 8 also comprises a field bus interface 810 for communicating on the field bus 801 with the pitch drive control module 9. Via the field bus 801 further sensor data or other data from other parts of the wind turbine can be received. Via this field bus 801, the pitch system control module 8 may be able to read the power that is generated by the electric generator in the nacelle 3. In this embodiment, the field bus 801 is also used to send and receive commands and data from three pitch drive control module 9 which individually control the pitch angle of each rotor blade 6a, 6b.

Figure 4:
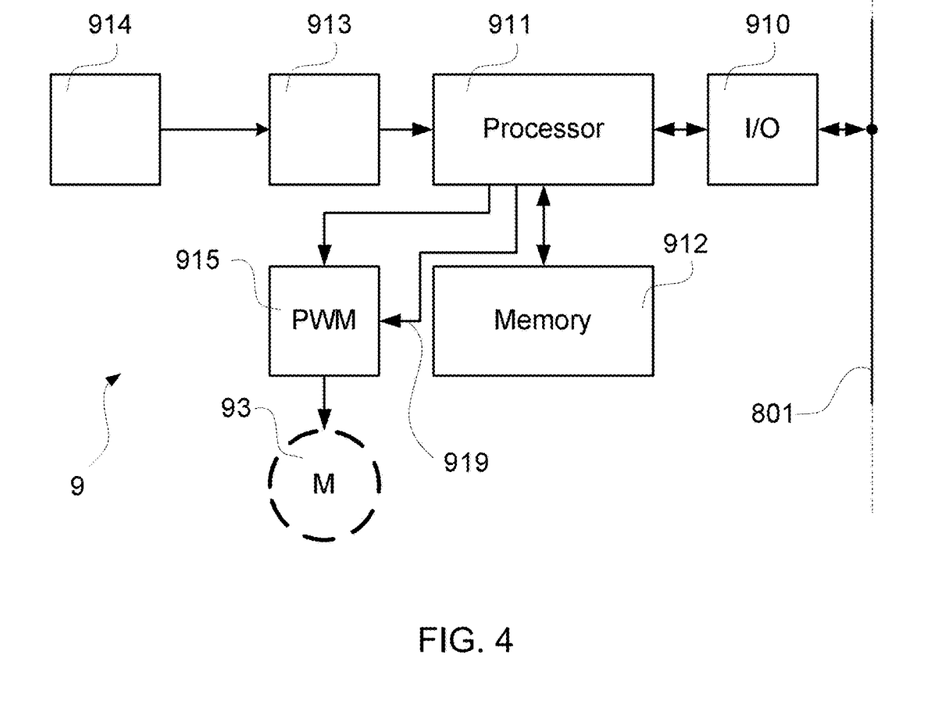
FIG. 4 shows a block circuit diagram of a pitch drive controller.

FIG. 4 shows illustrated as a block diagram one embodiment of components that may be included within the pitch drive control module 9. The pitch drive control module 9 comprises one or more processors 911 and associated memory devices 912 configured to perform a variety of computer-implemented functions such as performing the method steps, calculations and the like and storing relevant data as disclosed herein. The pitch drive control module 9 may be implemented as one or more printed card boards which are plugged into a pitch drive unit card board carrier back plane (not shown). For communicating with various sensors 914, a sensor interface 913 permits signals transmitted from sensors 914 to be converted into signals that can be understood and processed by the processor 911. The sensors 914 may be coupled to the sensor interface 913 via a wired connection which for example are electrically connected to the said pitch drive unit card board carrier back plane. In other embodiments they may be coupled to the sensor interface via a wireless connection.

The pitch drive control module 9 also comprises a field bus interface 910 for communicating on the field bus 801 with the pitch system control module 8. Via the field bus 801 further sensor data or other data from other parts of the wind turbine can be received. The processor 911 of the pitch drive control module 9 is connected to a pulse width modulator circuit 915 to control the rotation of the electro mechanical motor 93 for rotating the rotor blades 6a, 6b around their axis BA.

A safety control layer is implemented in each pitch drive 9 as a software module. The pitch system control module 8 and the three pitch drive control modules 9 are each running on processor systems developed according IEC 61508 and systematic capability greater safety integrity level SIL1.

They are communicatively connected via the field bus 802 which also fulfils IEC 61508 and systematic capability greater safety integrity level SIL1. IEC 61508 is the international standard for electrical, electronic and programmable electronic safety related systems which sets out the requirements for ensuring that systems are designed, implemented, operated and maintained to provide a required safety integrity level (SIL).

In operation of the wind turbine one or multiple failures may occur. In some wind turbines the pitch motors use a first angle sensor mounted close to an electric motor, for example on the motor shaft. This first angle sensor must be resistant to the heat the electric motor may produce when actuated. The type of angle sensor typically used for this purpose is called a resolver. The most common type of resolver is the brushless transmitter resolver with two two-phase windings, fixed at right angles to each other on a resolver stator, producing a sine and cosine feedback current. The relative magnitudes of the two-phase voltages are measured and used to determine the angle of a resolver rotor relative to the stator. In case a resolver has a single pair of two-phase windings, the feedback signals repeat their waveforms upon one full revolution. Such resolvers typically have a resolution of about 0.1°.

In wind turbines, AC motors were used for pitch drives in the past. However, the trend is to use brushless DC motors. The brushless DC motor is a synchronous electric motor with an electronically controlled commutation system. In a brushless DC motor permanent magnets form the rotor. In order to control the motor an electronic controller distributes the power stator windings such that a rotating magnet field is produced by the stator windings. By the feedback information provided by the resolver the position of the rotor is known and by this the position of the permanent magnets. With this knowledge the motor controller can generate the rotating magnetic field so that the electric motor rotates exactly at the desired speed and torque. If provided with the respective control program a brushless DC motors can be operated without the information from a position sensor, i.e. without the feedback of the resolver at the cost of accuracy. This operation mode is called in the following self-sensing mode. Self-sensing mode could be based on the detection of the Back Electro Magnetic Force (BEMF) induced by the movement of a permanent magnet rotor in front of stator winding. The self-sensing mode analyzes for example zero crossing of BEMF in order to synchronize phase commutations. For lower speeds, where BEMF is small in amplitude the magnetic asymmetry of the motor may be used instead. For example with interior permanent magnet synchronous motors (IPMSM), which are a subcategory of brushless motors, a current sensor may be used to measure a so-called injection current signal. From the injection current signal for example a Kalman filter is used to estimate the position of the rotor. Similarly, self-sensing modes are also available for brushed DC motors and synchronous AC motors.

However, in order to control the rotor blades accurately usually the pitch motors are operated with a resolver as a sensor for measuring the angle position of the motor shaft. In case of a failure of the resolver, the motor cannot be controlled accurately and in case of a blade encoder error the position of the rotor blade cannot be measured, risking that the pitch motor turns the rotor blade to the wrong position. To overcome such a situation the invention proposes in case a failure of the resolver is detected but no failure of the blade encoder is detected to switch the motor into self-sensing mode. Additionally the maximum speed can be reduced, for example to half of the rotation speed in sensor mode, to account for the reduced torque in self-sending mode. For example in an emergency situation the rotation speed of the rotor blade may be limited at 6° per second in sensor mode and reduced to 3° per second in self-sensing mode.

As the rotor blade is quite heavy and needs a high torque to be rotated usually a gear box is provided between motor and the tooth ring on which the rotor blade is mounted. Typically, the gearbox and a toothed ring that is driven by the gearbox have a transmission ratio of 1:1000 to 1:2000. Taking into account the transmission ratio of the gearbox the position of the rotor blade may be calculated from the resolver data. However, often a second angle decoder is provided at the vicinity of the rotor blade to measure the angle position of the rotor blade. For example in the feathering position the angle of the rotor blades are 90° and in full angle of attack to the wind they are turned substantially into a 0° position. Common angle encoders used for this location have for example a resolution of sixteen bit for a full 360° turn, which results in a resolution of approximately 0.005°. Alternatively twelve or thirteen bit multiturn encoders may be attached to a gear with a ratio of 1:100 to 1:200 which effectively achieves a resolution of effectively up to 0.0002°. Due to their relatively low temperature range such high precision angle decoders cannot be used close to the electrical motor.

In case a blade encoder error is detected the invention proposes to use the resolver information of the pitch motor to calculate the position of the rotor blade. Due to backslash of the gearbox etc. this may not be as accurate as the information from the blade encoder, but it is sufficient to stop the rotor blade at approximately 90°, still avoiding that sufficient lift is produced by the blade to restart to propel the rotor of the wind turbine. As the blade encoder usually produces absolute values, the resolver in contrast hereto usually produces relative values, preferably the pitch drive controller at start-up uses the absolute position provided by the blade encoder to reference the resolver encoder and continuously calculates and compares the resolver position with the blade encoder position. In case of a detected blade encoder failure the device controller can use the continuously calculated position to switch seamlessly from resolver mode into self-sensing mode.

Several other sensors such as a voltage sensor in this embodiment are used as, for example, to measure the capacity of a back-up power supply that is needed in case of a power failure of the generator or the power grid to power the pitch drive motors at least as long as they can turn the rotor blades into the feathering position. In this example, the analysis of the resolver, the blade encoder, and the backup are reduced to a simple binary decision "failure" or "no failure" of the analysed device.

In case a failure of the backup system is detected the invention proposes also to limit the speed of the pitch motor to a second limited speed. This second speed limit takes into account that the backup power supply in this special embodiment is permanently connected to the power supply to support a high current to be drawn by the pitch motor when turning at high speed and high torque. In case of a backup failure this support may not be available and a high speed at a high torque may cause a breakdown of the power supply. In this case it is assumed that it is less risk to pitch the rotor blades at a reduced but constant speed rather than risking a complete halt during a feathering run. This second limited speed may be even lower than for self-sensing mode, for example 2° per second.

The abovementioned errors may occur in combinations with each other. FIG. 5 shows in a table in a first column the error status of the resolver, whereby a failure of the resolver is indicated by an "X". Similarly, the second column shows a failure of the blade encoder indicated also by an "X" and a third column shows a failure of the backup system also indicated by an "X". As with three independent binary events there are eight different possible combinations of the error status of the resolver, the blade encoder, and the backup. The first line after the column headings of the table of FIG. 5 shows the situation where the resolver, the blade encoder and the backup have been analysed to work properly. Consequently, this modus is called "no error" mode E0. In the error free mode E0 the output value of the blade encoder is used by the controller to measure at any time the position of the rotor blade. Once the blade encoder transmits an angle of 90° to the controller, the controller can rely on this input value and will stop rotating the rotor blade when it has reached the final position for the feathering position. As the resolver is assumed to work properly, the controller controls the motor by using the high resolution data of the resolver. Also, as the back-up power supply does not indicate an error, the commands from the wind turbine controller are transparently forwarded from the controller to the controller. This is indicated in the table in the column SFR Profile (SFR stands for Safe Feathering Run) by the word "default" which means that the controller does not apply any modifications to the speed of the motors.

In case a failure of the resolver is detected, this is classified as a first error mode E1. This error mode has been discussed earlier above. As the blade encoder is not affected, the rotor blade position is measured by the blade encoder. The pitch motor, however, is switched from sensor mode, i.e. controlled by the resolver, into self-sensing mode, which also may be called a self-sensing mode. As explained above, the pitch motor speed is limited in the self-sensing mode to a first speed limit. The controller, in this case, uses an SFR profile which is called "self-sensing". When the "self-sensing" profile is applied the controller will modify the received commands so that when they are forwarded to the controller, the speed of the pitch motor is limited to the first speed limit. The limiting of the rotation speed of the pitch motor is just one example. In an SFR profile, other limitations may be applied to the controller, such as maximum current respectively torque limits.

In case a failure of the blade encoder is detected, but resolver and backup are working error-free, this is classified in this embodiment as second error mode E2. As already described above, in this second error mode, the rotor blade position is determined by using the resolver of the pitch motor. As the resolver is not affected, the motor can operate in the usual sensor mode and the SFR profile can remain as the default profile. However, due to the less accurate determined rotor blade position, a profile especially designed for that purpose may be used.

In case the controller detects a failure of the backup but resolver and blade encoder are indicating to work without errors, a special "backup failure" profile is applied in this embodiment of the invention. As already described above, the backup in the backup failure profile, the speed of the pitch drive is reduced to a second speed limit. However, other alternative or additional measures may be applied by the controller.

In case a failure of the resolver and a failure of the blade encoder is detected at the same time this is classified as fourth error mode E4. In fourth error mode E4 the invention proposes to prevent any movement by the pitch motor, to engage the mechanical brake and to request the other pitch drives to turn their rotor blades into the feathering position. Usually in wind turbine with three rotor blades it would suffice to have two of the three rotor blades in feathering position to be able to force the wind turbine rotor to a halt. The preventing of any movement can be achieved by resetting any commands received by the controller to a command that sets the speed to zero, respectively a command that stops the motor. In addition, or alternatively, the controller may use additional circuitry to block the controls of the pitch motor, for example by interrupting by means of switches the power supply to the a power inverter. Alternatively or in addition hereto all control inputs of the drive circuitry, for example the input lead of an H-bridge can be connected with zero voltage, so that independent whatever control signals are produced in the pitch drive, these control signals are short-circuited to a ground voltage and thus effectively overwritten. Especially the safety of motors without specific safety precautions can be improved with additional circuitry that is controlled for example by control signals 919 of the pitch system control module 9.

In case the controller detects the failure of the resolver and a failure of the backup but no failure of the late encoder is classified as error mode E5. In error mode 5, the rotor blade position is directly derived from the blade encoder as the blade encoder is functioned without error. Due to the failure of the resolver, the motor control is set into self-sensing mode and due to the failure of the backup the SFR profile chosen by the controller is the "backup-failure" profile.

In case the controller detects the failure of the blade encoder and at the same time the failure of the backup, but the resolver is reported to work without failure, the motor control continues in resolver mode, whereas the rotor blade position is measured by the resolver. Due to the backup failure, the chosen SFR profile is the "backup-failure" profile.

Finally, when the controller faces a situation where there is a cumulative error of the resolver, the blade encoder, and the backup, the controller classifies this as an error mode E4, similarly to a cumulative error of the resolver and the blade encoder. The measures taken in this case are safe torque off and safe break control. As in error mode 4, the pitch motor is stopped at once, the SFR profile applied does not matter. Important is only that the controller is reporting the error E4 to the other pitch drives so that the other pitch drives are commanded into a feathering run. Theoretically, however, the action "Safe Torque Off" may also be seen as a special SFR profile.

As can be seen from FIG. 5, some error modes are not only a pure combination of the measures in case a single failure has occurred. For example, the reaction to a combination of a resolver failure and a blade encoder failure, which is safe torque off, is not equivalent to a combination of error mode E1 and error mode E2. Therefore, the three different types of errors of this embodiment are dealt with in different ways when a combination of errors occurs.

Figure 6:
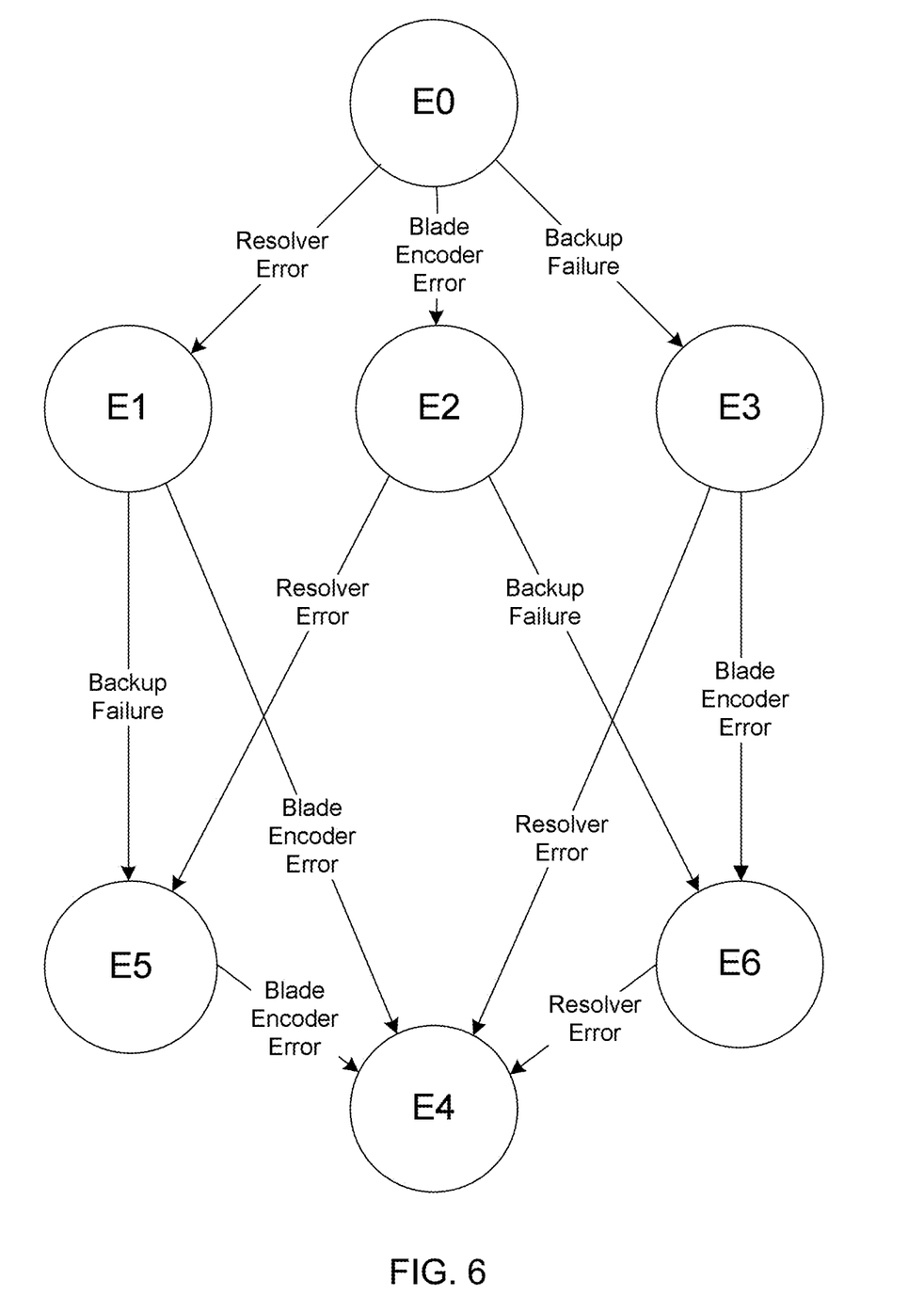
FIG. 6 shows valid transitions from different error sub-states.

FIG. 6 shows the transitions between the error free state E0 and the first error state E1, the second error state E2, the third error state E3, the fourth error state E4, the fifth error state E5, and the sixth error state E6. An autonomous movement of the rotor blades into the feathering position does not necessarily mean that it was caused by an error. The autonomous movement can also be started intentionally by the user when he wants, for example, to stop the wind turbine for maintenance purposes. In this case, the wind turbine would be in the error free sub-state E0. To stop the wind turbine without the need of an immediate stop in this embodiment a command "Normal Stop" would be used which allows a kind of soft slowing down of the rotor of the wind turbine. This does not only result in little wear of the pitch drives but also a reduction of load for the structure of the wind turbine, such as bending forces on the tower. In "Normal Stop" mode a special profile may be used that slowly turns the rotor blades into the feathering position, for example by limiting the speed to 20% of the maximum speed allowed for the pitch drives.

If no error occurs, the pitch drive stays in error-free sub-state E0 until it has reached the feathering position as planned. In error-free sub-state, as shown in FIG. 6, three error conditions may arise. In case of a resolver error, the pitch drive is adapted to transit to error sub-state E1; in case of a blade encoder failure it will transit to error sub-state E2; and in case of a back-up failure it will transit to error sub-state E3. Even if two failures seem to appear at the same time, the deterministic system will process one of the two or more errors one after the other. In the first error sub-state E1, only two more errors will be evaluated. A blade encoder error will transit the first error sub-state E1 into fourth error sub-state E4 and a backup failure will transit the first error sub-state E1 into the fifth error sub-state E5. Similarly, from second error sub-state E2, a resolver error will transit the pitch drive into the fifth error sub-state E5 and a blade encoder error will transit the second error sub-state E2 into the sixth error sub-state E6. Similarly, a resolver error will transit the third error sub-state E3 into the fourth error sub-state E4 and in case of a backup failure, the pitch drive is transited to sixth error sub-state E6. In case of a blade encoder error, the fifth error sub-state E5 is transited into the fourth error sub-state E4 and in case of a resolver error, the sixth error sub-state E6 is transited into the fourth error sub-state E4. E4 is the ultimate error sub-state as it is only applicable when all three evaluated error conditions have occurred.

As once can see from the transition diagram of FIG. 6, in case an error has occurred, there is no transition back to any of the previous error states as it is too risky to trust a sensor that was reported faulty before. In this case, the pitch drive will have to continue in the once attained error state until a technician has visited the wind turbine and has repaired the cause of the error and/or the error has been reset the described sub-states therefore allow a very clear control of the pitch drive in an error situation. This very clear error handling improves as such the safety of the pitch drive and the wind turbine in total.

What is claimed is:

1. A pitch control system for a wind turbine, the pitch control system comprising:
    a controller configured to detect a failure of a resolver that controls a first pitch motor of a first pitch drive of the wind turbine as a first error situation, to detect a failure of a blade encoder that measures a position of a first rotor blade that is driven by the first pitch drive as a second error situation, and to detect a failure of an emergency power back-up system for the first pitch drive as a third error situation, and
    wherein the controller is further configured to:
    initiate a first error procedure based on the detection of the first error situation in absence of the second and the third error situations;
    initiate a second error procedure based on the detection of the second error situation in absence of the first and the third error situations;
    initiate a third error procedure based on the detection of the first and the second error situations occurring at the same time in absence of the third error situation, wherein the third error procedure is different to the first error procedure and to the second error procedure;
    initiate a fourth error procedure based on the detection of the third error situation in absence of the first and the second error situations;
    initiate the third error procedure based on the detection of the first, the second and the third error situations occurring at the same time;
    initiate the first and the fourth error procedures based on the detection of the first and the third error situations occurring at the same time in absence of the second error situation; and
    initiate the second and fourth error procedures based on the detection of the second and the third error situations occurring at the same time in absence of the first error situation.

2. The pitch control system of claim 1, wherein:
    the third error procedure comprises at least one of interrupting a power supply to the first pitch motor, blocking a control signal for the first pitch motor, engaging a brake to block movement of the first rotor blade, or requesting at least a second pitch drive of the wind turbine to attain a neutral position.

3. The pitch control system of claim 1, wherein once the first or the second error situation has been detected, the respective terror situation is upheld despite the respective error having disappeared.

4. The pitch control system of claim 1, wherein the first error procedure comprises the first pitch motor being switched to a self-sensing mode in which it controls its speed by sensing its own current supply.

5. The pitch control system of claim 1, wherein the first error procedure comprises applying a limitation to the first pitch drive.

6. The pitch control system of claim 5, wherein the limitation comprises a speed limit or an acceleration limit.

7. The pitch control system of claim 1, wherein the second error procedure comprises calculating the position of the first rotor blade from data from the resolver.

8. The pitch control system of claim 1, wherein the fourth error procedure comprises turning the first rotor blade into a neutral position.

9. The pitch control system of claim 1, wherein the fourth error procedure comprises applying a limitation to the first pitch drive.

10. The pitch control system of claim 9, wherein the limitation comprises a speed limit or an acceleration limit.

11. The pitch control system of claim 1, wherein:
    the first error procedure comprises the pitch drive motor being switched to a self-sensing mode in which it controls its speed by sensing its own current supply;
    the second error procedure comprises the position of the rotor blade being calculated from data from the resolver for the pitch drive;
    the third error procedure comprises at least one of interrupting a power supply to the first pitch motor, blocking a control signal for the first pitch motor, engaging a brake to block movement of the first rotor blade, requesting at least a second pitch drive of the wind turbine to attain a neutral position; and
    the fourth error procedure comprises applying a limitation to the pitch drive of the wind turbine.

12. A method of operating a pitch control system of a wind turbine, the method comprising:
    detecting for presence of:

a failure of a resolver that controls a first pitch motor of a first pitch drive of the wind turbine as a first error situation;

a failure of a blade encoder that measures a position of a first rotor blade that is driven by the first pitch drive as a second error situation; and a failure of an emergency power back-up system for the first pitch drive as a third error situation, and initiating a first error procedure in a case of the detection of the first error situation in absence of the second and the third error situations;

initiating a second error procedure in a case of the detection of the second error situation in absence of the first and the third error situations;

initiating a third error procedure in a case of the detection of the first and the second error situations occurring at the same time in absence of the third error situation, wherein the third error procedure is different to the first error procedure and to the second error procedure;

initiating a fourth error procedure in a case of the detection of the third error situation in absence of the first and the second error situations;

initiating the third error procedure in a case of the detection of the first, the second and the third error situations occurring at the same time;

initiating the first and the fourth error procedures in a case of the detection of the first and the third error situations occurring at the same time in absence of the second error situation; and initiating the second and fourth error procedures in a case of the detection of the second and the third error situations occurring at the same time in absence of the first error situation.

\* \* \* \* \*